(12) United States Patent
Narayanan et al.

(10) Patent No.: US 9,229,517 B2
(45) Date of Patent: Jan. 5, 2016

(54) COMPUTER INPUT DEVICE POWER SAVINGS

(71) Applicant: INTEL CORPORATION, Santa Clara, CA (US)

(72) Inventors: Anantha Narayanan, Bangalore (IN); Rohit Malaviya, Bangalore (IN); Manish Sharma, Bangalore (IN); Arvind S, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 14/145,776

(22) Filed: Dec. 31, 2013

(65) Prior Publication Data

US 2015/0185800 A1 Jul. 2, 2015

(51) Int. Cl.
*G06F 3/041* (2006.01)
*G06F 1/32* (2006.01)

(52) U.S. Cl.
CPC ............... *G06F 1/32* (2013.01); *G06F 1/3287* (2013.01); *G09G 2330/021* (2013.01)

(58) Field of Classification Search
CPC ... G06F 1/3234; G06F 1/3259; G06F 1/3262; G06F 1/3265; G06F 1/3287; G06F 3/033; G06F 3/0386; G09G 2330/021
See application file for complete search history.

(56) References Cited

U.S. PATENT DOCUMENTS

| | | | | |
|---|---|---|---|---|
| 5,483,262 A | * | 1/1996 | Izutani | 345/179 |
| 5,635,959 A | * | 6/1997 | Takeuchi | G06F 1/1626 178/19.01 |
| 5,973,677 A | * | 10/1999 | Gibbons | 345/179 |
| 6,114,958 A | * | 9/2000 | Murphy | G06F 1/1616 200/61.59 |
| 6,223,294 B1 | * | 4/2001 | Kondoh | 713/310 |
| 6,681,333 B1 | * | 1/2004 | Cho | G06F 1/1626 345/179 |
| 6,924,791 B1 | * | 8/2005 | Nicolas et al. | 345/179 |
| 7,053,883 B1 | * | 5/2006 | Kwok et al. | 345/156 |
| 7,961,150 B2 | * | 6/2011 | Kyou et al. | 343/702 |
| 7,994,913 B2 | * | 8/2011 | Lee | 340/568.1 |
| 8,242,389 B2 | * | 8/2012 | Chen et al. | 178/19.01 |
| 8,259,091 B2 | * | 9/2012 | Yeh | 345/179 |
| 8,471,833 B2 | * | 6/2013 | Tsui et al. | 345/179 |
| 8,947,379 B2 | * | 2/2015 | Bakken et al. | 345/173 |
| 9,013,455 B2 | * | 4/2015 | Mercea et al. | 345/179 |
| 2004/0108997 A1 | * | 6/2004 | Lee | 345/179 |
| 2004/0212586 A1 | * | 10/2004 | Denny, III | 345/156 |
| 2005/0270167 A1 | * | 12/2005 | Lai | G06F 21/83 340/687 |
| 2005/0270277 A1 | * | 12/2005 | Park | 345/173 |
| 2007/0103455 A1 | * | 5/2007 | Omata et al. | 345/179 |
| 2007/0188479 A1 | * | 8/2007 | Wang | G06F 1/1626 345/179 |
| 2008/0036747 A1 | * | 2/2008 | Hope | 345/179 |
| 2009/0114458 A1 | * | 5/2009 | Chen | G06F 1/1626 178/19.01 |
| 2014/0085272 A1 | * | 3/2014 | Ozawa | 345/179 |

* cited by examiner

*Primary Examiner* — Joe H Cheng
(74) *Attorney, Agent, or Firm* — International IP Law Group, P.L.L.C.

(57) ABSTRACT

In some embodiments a computing device includes a holder to hold an input device, a detector to detect whether the input device is held by the holder, and a controller to manage power of the device in response to the detection. Other embodiments are described and claimed.

39 Claims, 3 Drawing Sheets

Stylus pen and Sensor power manager Hardware and software components

COMPUTER INPUT DEVICE POWER SAVINGS

TECHNICAL FIELD

The inventions generally relate to power savings related to computer peripherals and/or input devices.

BACKGROUND

A digitizer pen (also known as a stylus) is an important input device for several computing device form factors such as, for example, a handheld computing device, a smartphone, a tablet, a portable All-In-One (pAIO) computer, a large All-In-One (AIO) computer, etc. However, like other devices, an input device such as a digitizer pen also consumes power. It is becoming more and more critical to save power in every way possible for these types of devices, particularly systems running on battery power.

When not being used, an input device such as a digitizer pen is placed in an input device holder/charging unit (pen holder/charging unit) which is mounted on the system. Currently, regardless of whether a user is using the digitizer, a digitizer sensor sheet at the top of the display panel remains in an ON condition and continues drawing power from the source (for example, an AC power source or a battery).

Some current implementations switch off the digitizer sensor only when the display is off. When a user is using other input devices or using the system for some other purpose, the digitizer sensor panel is still on and draining power.

Portable All-In-One (pAIO) systems are All-In-One (AIO) computers which also run on batteries. Portable All-In-Ones often have large displays, and such systems may also include multiple digitizer pens, making it even more critical to save power (for example, battery power).

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to power savings for computer peripherals, input devices, and/or digitizer pens.

In some embodiments a computing device includes a holder to hold an input device, a detector to detect whether the input device is held by the holder, and a controller to manage power of the computing device in response to the detection.

In some embodiments, detection is made as to whether an input device is held in a holder of a computing device, and power of the computing device is managed in response to the detecting.

In some embodiments, at least one computer-readable medium includes one or more instructions that when executed on a computing device cause the computing device to detect whether an input device is held in a holder of a computing device, and to manage power of the computing device in response to the detecting.

In some embodiments, power is saved when an input device such as a digitizer pen (also known as a stylus) is not being used. For example, a digitizer pen is always placed in a pen holder and/or charging unit of a computing system when the input device (e.g., digitizer pen or stylus) is not being used. A removal of the input device (e.g., digitizer pen or stylus) from the input device holder and/or charging unit (e.g., pen holder and/or charging unit) is detected, and a digitizer sensor panel is switched on only when the removal has been detected. The digitizer sensor panel is switched off when the input device is placed back in the holder.

In some embodiments, presence of an input device (such as a digitizer pen) in an input device holder (such as a pen holder) of a computing device is detected (for example, at the back of a portable AIO) using a mechanical or electronic sensor. When the input device is removed, a digitizer sensor sheet on the display panel is switched on. When the input device is placed back into its holder, the digitizer sensor sheet on the display panel is switched off to save power. Additionally, when the input device is removed, an input device charging unit (such as a digitizer pen charging unit) is switched off to save power. When the input device is placed back in the holder, the input device charging unit is switched on in order to charge the input device.

In some previous solutions a digitizer sensor is switched off only when the display is off (for example, when a user is using other input devices such as a keyboard, mouse, or touch panel). The display is on and the digitizer sensor sheet on the display panel will still draw power (for example, approximately 150 mW in some implementations). In some embodiments, removal of an input device (such as a pen, stylus, or digitizer pen) from a holder is used as an activation mechanism to switch on and/or off a digitizer sensor sheet on the display panel. Thus, a cumulative power savings is achieved according to some embodiments.

Figure 1:
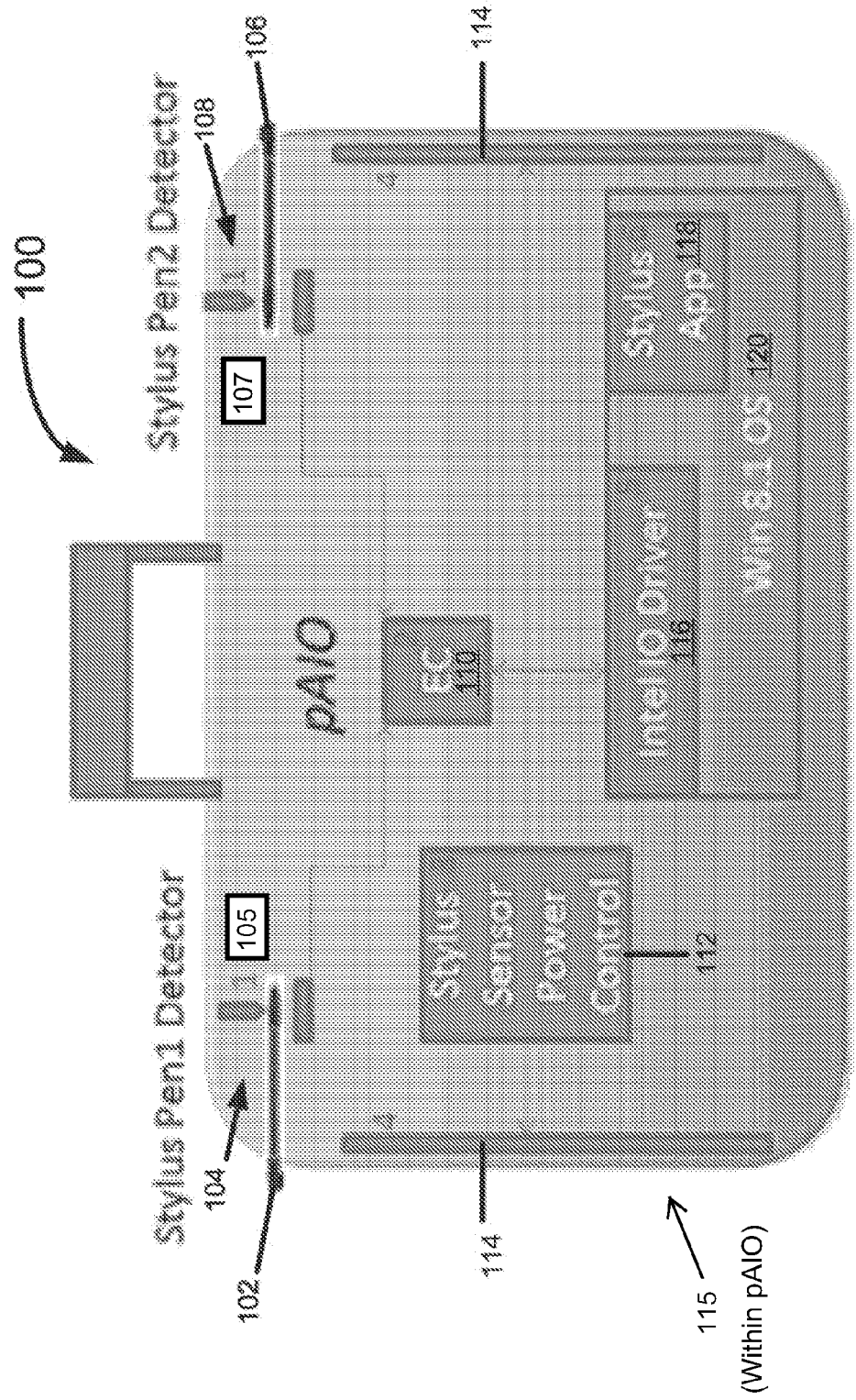
FIG. 1 illustrates a system according to some embodiments of the inventions.

FIG. 1 illustrates a computing system 100 according to some embodiments. In some embodiments computing system 100 is an All-In-One (AIO) system, a portable All-In-One (pAIO) system, a portable computing system, a laptop computing system, a tablet, a mobile phone, and/or any other type of computing system. In some embodiments, computing system 100 includes a first input device 102 (for example, a stylus, a pen, a digitizer pen, and/or any other type of input device), a first input device holder 104 (and/or a first input device holder with a detector), a second input device 106 (for example, a stylus, a pen, a digitizer pen, and/or any other type of input device), a second input device holder 108 (and/or a second input device holder with a detector), an embedded controller (EC) 110 (for example, an embedded microcontroller on a motherboard of the system 100), a digitizer sensor sheet power controller 112, a digitizer sensor sheet 114, an Input/Output driver (I/O driver) 116, an input device application software framework 118, and an operating system 120 (for example, a Windows operating system such as WIN 8.1 OS). In some embodiments, I/O driver 116, application 118, and/or OS 120 are implemented in software. In some embodiments controller 110 and/or controller 112 are implemented in hardware, firmware, and/or software (that is, in some embodiments, some combination of software, firmware, and/or hardware).

In some embodiments, FIG. 1 illustrates a system 100 including components of an input device and sensor power management system (for example, a digitizer pen and sensor power management system). In some embodiments, system 100 includes a digitizer pen and sensor power management system in a portable AIO (pAIO) computer. In some embodiments, system 100 includes a stylus pen and sensor power management system in a pAIO computer.

In some embodiments, the digitizer pen holder with detector 104 and/or 108 is a mechanical switch or an electronic object detector. In some embodiments, controller 110 is an embedded microcontroller on a motherboard of the system 100. In some embodiments, controller 112 is a digitizer sensor sheet power control MOSFET (Metal Oxide Semiconductor Field Effect Transistor) on the motherboard of the system 100. In some embodiments, digitizer sensor sheet 114 is one digitizer sensor sheet. In some embodiments, digitizer sensor sheet 114 is two or more digitizer sensor sheets. In some embodiments, I/O driver software 116 is Intel I/O driver software running on OS 120. In some embodiments, application 118 is a digitizer pen application software framework running on OS 120.

In some embodiments, when the input device 102 is not being used, the input device 102 is placed in the holder/detector 104 by the user and a mechanical switch (for example, a mechanical tact switch or mechanical contact switch) or an electronic object detector detects that the input device is not being used, and signals the EC controller 110 (for example, though a General Purpose I/O or GPIO pin). In this manner, power to the charging unit for the holder/detector 104 is switched ON. Similarly, in some embodiments, when the input device 106 is not being used, the input device 106 is placed in the holder/detector 108 by the user and a mechanical switch (for example, a mechanical tact switch or mechanical contact switch) or an electronic object detector detects that the input device is not being used, and signals the EC controller 110 (for example, though a General Purpose I/O or GPIO pin). In this manner, power to the charging unit for the holder/detector 108 is switched ON.

When the input device 102 or 106 is removed from the holder 104 or 108, the mechanical switch for that holder is un-pressed in some embodiments. Similarly, when the input device 102 or 106 is removed from the holder 104 or 108, an electronic object detector is used where light (for example, infrared or IR light) falls directly on the detector (for example, an IR detector). In response to either of these, the controller 110 GPIO pin is pulled high in some embodiments, generating an interrupt to the controller 110.

In some embodiments the controller 110 again polls the sensor to find out if the input device 102 and/or 106 has really been removed from the holder 104 and/or 108, or if it is a false signal. If the controller 110 finds that the GPIO signal is still low after a few milliseconds, for example, the controller 110 enables the controller 112 (e.g., the power gate control for the digitizer sheet sensor 114), and turns on power to the digitizer sensor sheet 114 on the display panel 115 of the system 100. Additionally, power to the input device charging circuit 105, 107 (for example, included in holder 104 and/or holder 108) is turned off.

When the input device 102 and/or 106 is mounted back in the holder 104 and/or 108 after usage, the mechanical and/or electronic detector sends a GPIO signal to controller 110 to interrupt the controller 110 and to turn off power to the digitizer sensor sheet 114 using controller 110 and/or controller 112. In some embodiments, software running on controller 110 turns off the digitizer sensor sheet power when both the pens 102 and 106 are placed in the holder 104 and/or 108.

Figure 2:
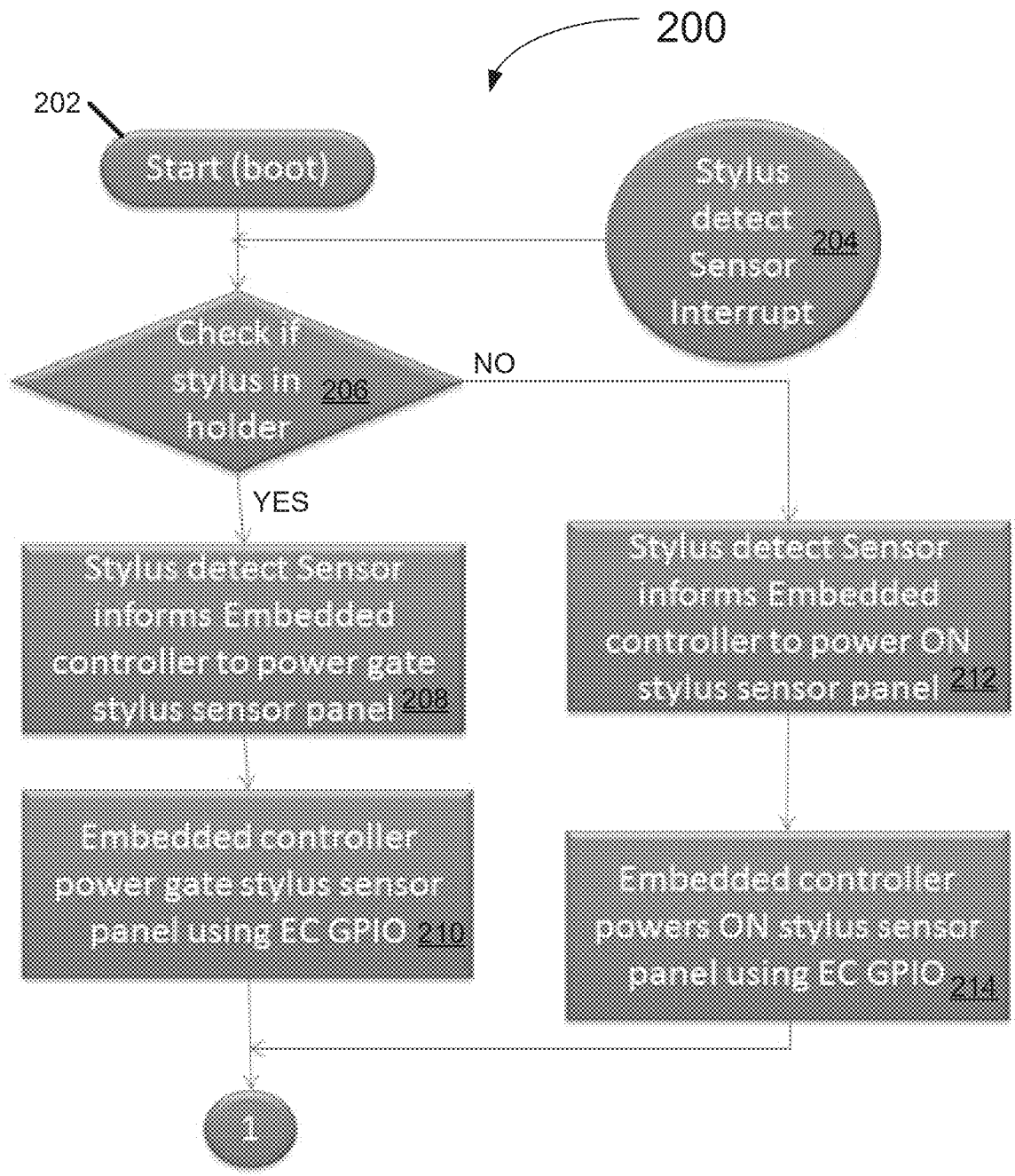
FIG. 2 illustrates a flow according to some embodiments of the inventions.

FIG. 2 illustrates a flow 200 according to some embodiments. In some embodiments, flow 200 is implemented in software running on a controller (for example, controller 110 and/or 112 of FIG. 1). At 202 a start (boot) operation occurs. At 204 an interrupt is detected (for example, detection of an input device sensor interrupt). At 206 a decision is made as to whether or not an input device is in a holder (for example, in some embodiments, whether an input device 102 and/or an input device 106 is in a holder 104 and/or in a holder 108). At 208, a digitizer sensor panel (for example, digitizer sensor sheet 114 in FIG. 1) is power gated using a controller (for example, controller 110 and/or 112) so that no power is provided to the digitizer sensor panel (for example, digitizer sensor sheet 114 of FIG. 1). At 212, a controller (for example, controller 110 and/or controller 112) receives a signal to power ON a digitizer sensor panel (for example, a stylus detect sensor informs a controller to power ON a digitizer sensor panel such as digitizer sensor sheet 114 in FIG. 1). At 214 a controller (such as controller 110 and/or 112) powers on a sensor panel (such as digitizer sensor sheet 114) using, for example, one or more GPIO pins of a controller such as an embedded microcontroller).

Figure 3:
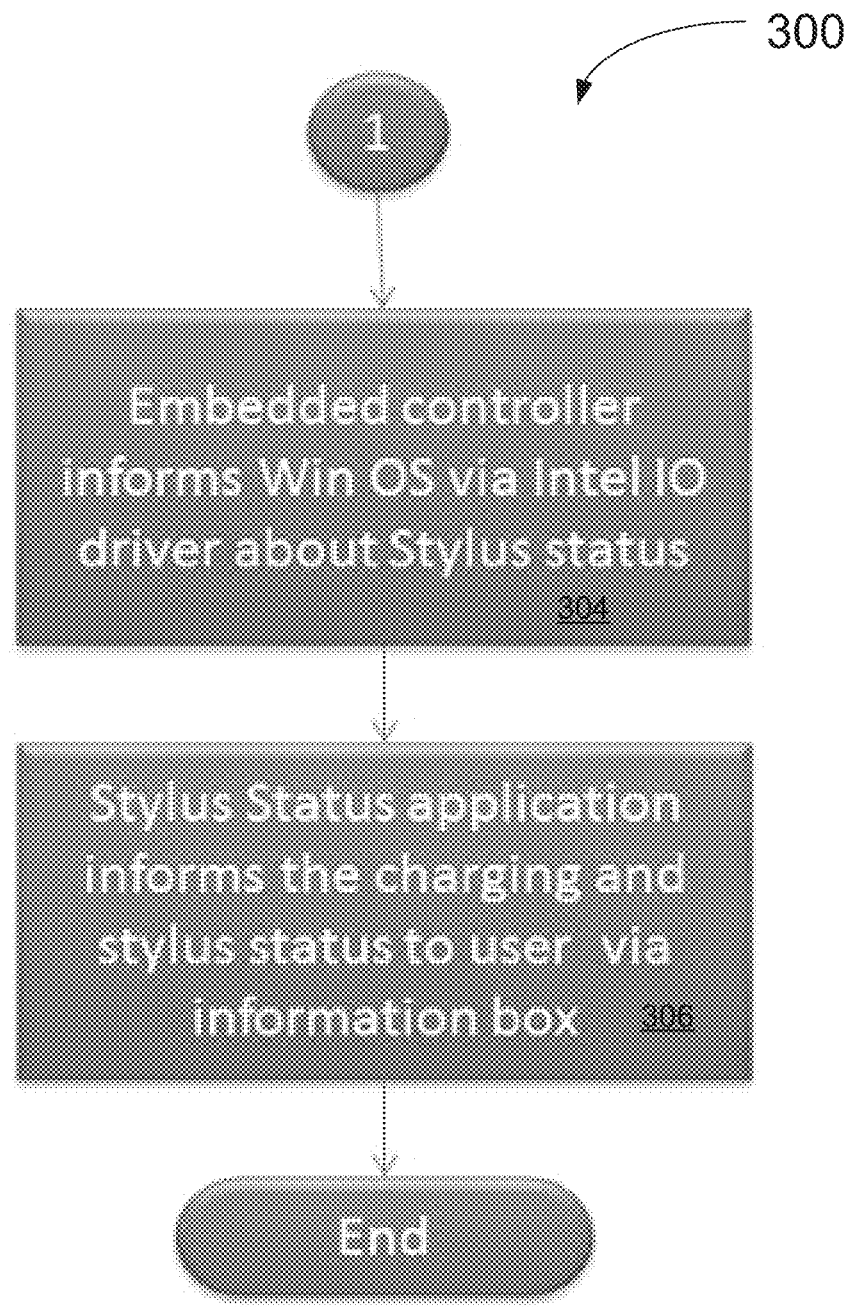
FIG. 3 illustrates a flow according to some embodiments of the inventions.

FIG. 3 illustrates a flow 300 according to some embodiments. In some embodiments, flow 300 is implemented in software running on a controller (for example, controller 110 and/or 112 of FIG. 1). In some embodiments, flow 300 is a continuation of flow 200 of FIG. 2. At 304, a controller (for example, controller 110 and/or 112 of FIG. 1) informs an operating system (OS) such as, for example, OS 120 of FIG. 1 via an IO driver (for example, IO driver 116 of FIG. 1) about the status of the input device. At 306, a user is informed of a charging and input device status via an information box.

In some embodiments an input device presence and charging circuit is included (for example, as part of holder/detector 104 and/or of holder/detector 108). In some embodiments, the input device presence and charging circuit is a digitizer presence and charging circuit. In some embodiments, when the input device is inserted, the input device presence and charging circuit detects that the input device is in the holder and is getting charged by sensing the current flowing through a current sense resistor, for example. In some embodiments, when both input devices are placed in their holders (for example, both input device 102 and input device 106), an input device controller board (for example, a digitizer controller board) goes into standby mode and can be power gated. When the input device is fully charged, a circuit current drop is detected by the circuit and the input device charging circuit is switched off.

In some embodiments, when a digitizer pen is placed in a digitizer pen holder, display sheet sensor panel power consumed is reduced to zero. When it is not in the digitizer pen holder, the power is supplied to the display sheet sensor panel.

Although some embodiments have been described herein as being implemented in a certain way, according to some embodiments these particular implementations may not be required.

In some embodiments, power savings result in lower power consumption, a reduction in heating of the system, a better user experience, and/or longer running time on battery power, etc.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A computing device comprising:
   a holder to hold an input device;
   a detector to detect whether the input device is held by the holder; and
   a controller to manage power of the computing device in response to the detection, wherein in response to detecting that the input device is not held by the holder, the controller is to poll the detector to determine if the input device has been removed from the holder.

2. The computing device of claim 1, wherein the input device is one or more of a pen, a digitizer pen, or a stylus.

3. The computing device of claim 1, wherein the computing device is one or more of an All-In-One system, a portable All-In-One system, a portable computing system, a laptop computing system, a tablet, or a mobile phone.

4. The computing device of claim 1, further comprising a display.

5. The computing device of claim 1, further comprising an input device sensor, the controller to control power to the input device sensor in response to the detection.

6. The computing device of claim 5, wherein the input device sensor is an input device sensor panel.

7. The computing device of claim 6, further comprising a display, wherein the input device sensor panel is a portion of the display.

8. The computing device of claim 5, the controller to switch on the input device sensor if the input device is removed from the holder.

9. The computing device of claim 5, the controller to switch off the input device sensor if the input device is in the holder.

10. The computing device of claim 5, the controller to charge the input device when the input device is in the holder.

11. The computing device of claim 5, the controller to turn off a charging circuit if the input device is not in the holder.

12. The computing device of claim 5, wherein the input device sensor is a sensor of a display panel.

13. The computing device of claim 1, the holder further to charge the input device.

14. A method comprising:
    detecting whether an input device is held in a holder of a computing device;
    managing power of the computing device in response to the detecting; and
    polling to determine if the input device has been removed from the holder.

15. The method of claim 14, wherein the input device is one or more of a pen, a digitizer pen, or a stylus.

16. The method of claim 14, wherein the computing device is one or more of an All-In-One system, a portable All-In-One system, a portable computing system, a laptop computing system, a tablet, or a mobile phone.

17. The method of claim 14, further comprising controlling power to a display of the computing device in response to the detecting.

18. The method of claim 14, further comprising controlling power to an input device sensor of the computing device in response to the detecting.

19. The method of claim 14, further comprising controlling power to an input device sensor panel of the computing device in response to the detecting.

20. The method of claim 14, further comprising controlling power to an input device sensor panel of a display of the computing device in response to the detecting.

21. The method of claim 14, further comprising controlling power to an input device sensor of the computing device if the input device is removed from the holder.

22. The method of claim 14, further comprising switching off an input device sensor of the computing device if the input device is held by the holder.

23. The method of claim 14, further comprising charging the input device when the input device is in the holder.

24. The method of claim 14, further comprising turning off a charging circuit if the input device is not in the holder.

25. The method of claim 14, further comprising controlling power to an input device sensor of a display panel of the computing device in response to the detecting.

26. The method of claim 14, further comprising charging the input device.

27. At least one non-transitory computer-readable medium comprising one or more instructions that when executed on a computing device cause the computing device to:
    detect whether an input device is held in a holder of a computing device;
    manage power of the computing device in response to the detecting; and
    polling to determine if the input device has been removed from the holder.

28. The at least one non-transitory computer-readable medium of claim 27, wherein the input device is one or more of a pen, a digitizer pen, or a stylus.

29. The at least one non-transitory computer-readable medium of claim 27, wherein the computing device is one or more of an All-In-One system, a portable All-In-One system, a portable computing system, a laptop computing system, a tablet, or a mobile phone.

30. The at least one non-transitory computer-readable medium of claim 27, the one or more instructions when executed on a computing device further cause the computing device to control power to a display of the computing device in response to the detecting.

31. The at least one non-transitory computer-readable medium of claim 27, the one or more instructions when executed on a computing device further cause the computing device to control power to an input device sensor of the computing device in response to the detecting.

32. The at least one non-transitory computer-readable medium of claim 27, the one or more instructions when executed on a computing device further cause the computing device to control power to an input device sensor panel of the computing device in response to the detecting.

33. The at least one non-transitory computer-readable medium of claim 27, the one or more instructions when executed on a computing device further cause the computing device to control power to an input device sensor panel of a display of the computing device in response to the detecting.

34. The at least one non-transitory computer-readable medium of claim 27, the one or more instructions when executed on a computing device further cause the computing device to control power to an input device sensor of the computing device if the input device is removed from the holder.

35. The at least one non-transitory computer-readable medium of claim 27, the one or more instructions when executed on a computing device further cause the computing device to switch off an input device sensor of the computing device if the input device is held by the holder.

36. The at least one non-transitory computer-readable medium of claim 27, the one or more instructions when executed on a computing device further cause the computing device to charge the input device when the input device is in the holder.

37. The at least one non-transitory computer-readable medium of claim 27, the one or more instructions when executed on a computing device further cause the computing device to turn off a charging circuit if the input device is not in the holder.

38. The at least one non-transitory computer-readable medium of claim 27, the one or more instructions when executed on a computing device further cause the computing device to control power to an input device sensor of a display panel of the computing device in response to the detecting.

39. The at least one non-transitory computer-readable medium of claim 27, the one or more instructions when executed on a computing device further cause the computing device to charge the input device.

\* \* \* \* \*